United States Patent
Aoki (10) Patent No.: US 6,689,960 B2
(45) Date of Patent: Feb. 10, 2004

(54) SEAT WEIGHT MEASURING APPARATUS WHICH DETERMINES THE WEIGHT VALUE BASED ON A VALUE OTHER THAN THE ADDER OUTPUT WHEN SENSOR OUTPUT EXCEEDS A PREDETERMINED VALUE

(75) Inventor: Hiroshi Aoki, Ritto (JP)

(73) Assignee: Takata Corporation, Tokyo (JP)

(*) Notice: Subject to any disclaimer, the term of this patent is extended or adjusted under 35 U.S.C. 154(b) by 69 days.

(21) Appl. No.: 10/091,450

(22) Filed: Mar. 7, 2002

(65) Prior Publication Data
US 2002/0125051 A1 Sep. 12, 2002

(30) Foreign Application Priority Data
Mar. 8, 2001 (JP) .......................... 2001-064439

(51) Int. Cl.$^7$ .............. B06N 2/00; G01L 5/00
(52) U.S. Cl. ............ 177/25.13; 177/144; 177/185; 177/199; 177/200; 701/45; 180/273
(58) Field of Search ............... 180/273; 280/735; 701/45; 177/25.13, 25.19, 136, 144, 199, 200, 210 R, 185

(56) References Cited

U.S. PATENT DOCUMENTS

| | | | | |
|---|---|---|---|---|
| 4,347,903 A | * | 9/1982 | Yano et al. ............ | 177/185 |
| 4,553,619 A | * | 11/1985 | Fujinaga ............... | 177/185 |
| 4,782,904 A | * | 11/1988 | Brock .................. | 177/185 |
| 4,828,056 A | * | 5/1989 | Wales et al. ........... | 177/185 |
| 5,585,604 A | * | 12/1996 | Holm ................... | 177/25.13 |
| 6,246,936 B1 | * | 6/2001 | Murphy et al. .......... | 701/45 |

* cited by examiner

Primary Examiner—David Martin
(74) Attorney, Agent, or Firm—Foley & Lardner (57) ABSTRACT

A seat load measuring apparatus that can provide an accurate load output even when one or more sensors are exerted with a load in excess of its measurable load is provided. In a first instance, the output of each load sensor is read at Step S11. Subsequently, at step S12, whether or not there is any sensor whereof the output is in excess of the predetermined value is determined. If no output of these sensors is in excess of the predetermined value, it is regarded as normal, and the seat weight is obtained by summation of the outputs of the sensors at Step S13. When the output of any sensor exceeds the predetermined value, it is determined that an offset load is exerted thereon and thus the output of the sensor in question cannot be trusted. Therefore, the seat weight obtained immediately before the output of any of the sensors exceeds the predetermined value is regarded as the seat weight.

18 Claims, 9 Drawing Sheets

SEAT WEIGHT MEASURING APPARATUS WHICH DETERMINES THE WEIGHT VALUE BASED ON A VALUE OTHER THAN THE ADDER OUTPUT WHEN SENSOR OUTPUT EXCEEDS A PREDETERMINED VALUE

BACKGROUND

The present invention relates to a seat weight measuring apparatus for measuring the weight of a seat in the passenger car (the seat weight referred to in this application includes the weight of a passenger or of an object as well as the weight of the seat itself, when a passenger is sitting thereon or an object is placed thereon).

As devices having the responsibility to ensure safety of occupants, the passenger car is equipped with seat belts or airbags. In recent years, attempts have been made to control the action of these safety devices depending on the weight (body weight) of the occupant in order to improve the performance of these systems. For example, the values such as the amount of gas for deploying the air bag, the deployment speed thereof, or the pretension of the seatbelt are adjusted depending on the body weight of the occupant.

In order to perform such control, it is necessary to measure the weight of the occupant sitting on the seat. As an example of methods for measuring the weight of the occupant, there is proposed a system which involves arranging load sensors (e.g., strain gauges) at four corners of the seat at the bottom of the seat, obtaining loads exerted on each corner, summing these values to obtain the weight of the seat including the weight of the occupant, and calculating the weight of the occupant from the difference between the seat weights with and without an occupant sitting thereon.

Figure 8A:
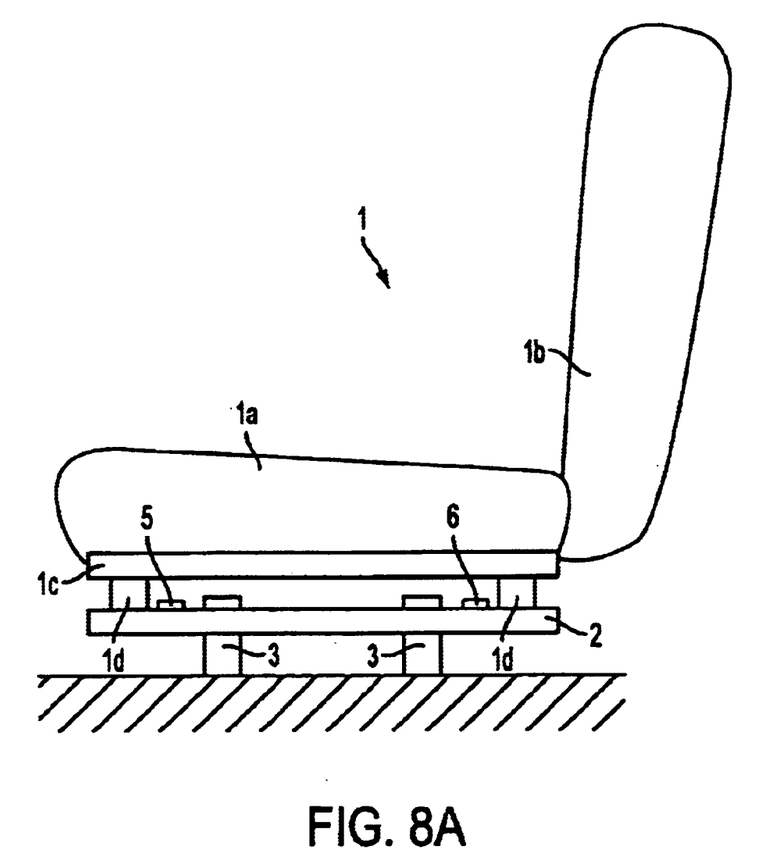
FIG. 8 is a drawing showing an example of the seat weight measuring apparatus.
Figure 8B:
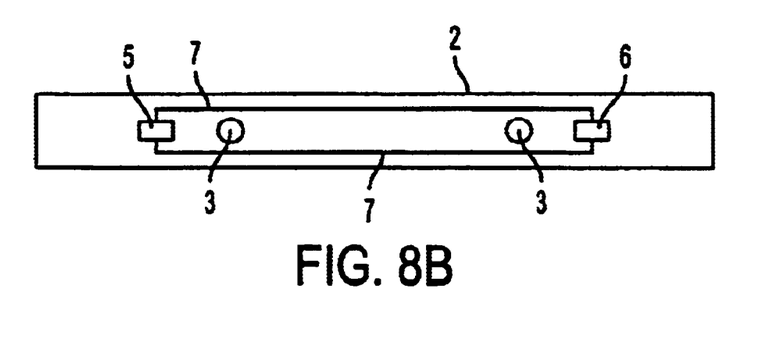

FIG. 8 shows an example of such seat weight measuring apparatus. In FIG. 8, the seat 1 includes a seat cushion 1a, a seatback 1b, a seat rail 1c, and a seat leg 1d is supported by the displacing member 2, which in turn is secured on the floor via a bracket 3. The displacing member 2 is formed of steel, and is formed with load sensors 5, 6 and a printed wiring 7 integrally on the surface thereof by a printing technology. When the load of the seat 1 is transmitted to the displacing member 2 via the seat leg 1d, the displacing member 2 is bent by a force exerted by the seat leg 1d working as a power point while being supported by a bracket 3 as fulcrum, and the displacement thereof is detected by the load sensors 5, 6. Though only two load sensors are shown in FIG. 8, the seat 1 is actually provided with seat legs 1d at four corners thereof, and thus four load sensors are provided to obtain the seat weight from the summation of the outputs of these four sensors.

Figure 9:
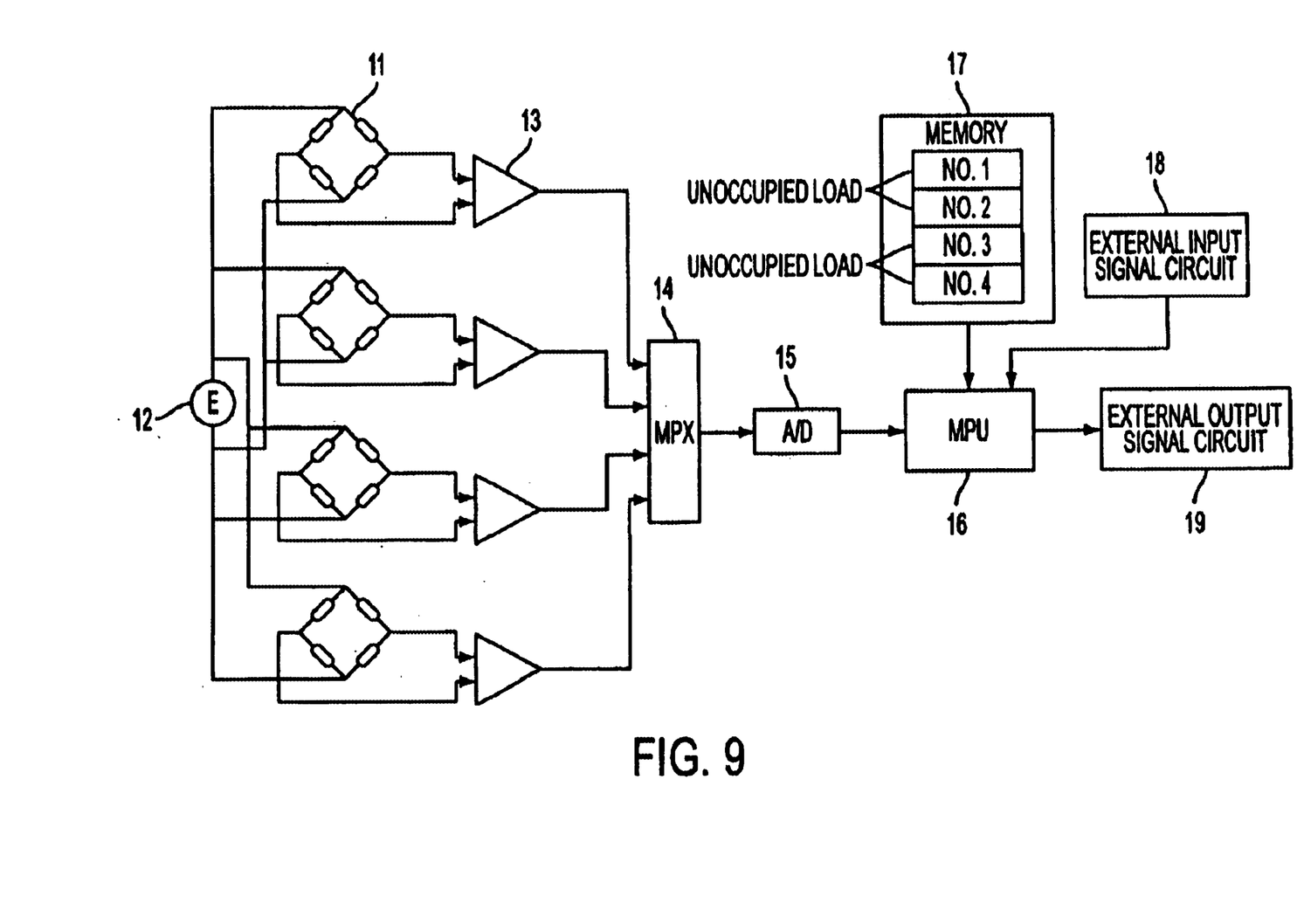
FIG. 9 is a drawing showing an example of the measuring circuit of the seat load measuring apparatus.

FIG. 9 shows an example of the measuring circuit in such seat load measuring apparatus. In FIG. 9, the reference numeral 11 designates strain gauges provided at four corners on the bottom of the seat, and a constant voltage is exerted on each strain gauge 11 by a power supply unit 12. When the resistance value of the resistance element that constitutes a bridge varies due to exertion of load onto the strain gauge 11, the balance of the bridge varies, and slight voltage is generated at the strain gauge 11. The generated voltage is amplified by the differential amplifier 13 and supplied therefrom.

Actually, the outputs of these four differential amplifiers are supplied to a multiplexer 14, selected sequentially to be converted into digital values at an A/D converter 15, and supplied to a mechanism for processing the values, typically a microprocessor unit (MPU) 16. MPU 16 reads the outputs of respective amplifiers 13 sequentially, multiplies them by a conversion factor (factor of sensitivity) respectively to obtain load values, and sums them up to obtain an total seat load. The seat load is then utilized to control the aforementioned seatbelts or airbags in the MPU 16 or by supplying the outputs to the external output circuit 19 as required.

Each strain gauge 11 has an offset voltage. The offset voltage is a voltage generated when the load is zero, and since the value of the offset voltage varies among the strain gauges 11, the offset voltages have to be compensated in order to measure the load accurately. In addition, since the value measured by the strain gauge 11 is a sum of the weights of the occupant and of the seat itself, the weight of the seat itself have to be deducted in order to obtain the weight of the occupant. The MPU 16 has a feature to perform such adjustment (tare adjustment). In other words, when a command signal is supplied from the external input signal circuit 18 with no occupant sitting on the seat, the MPU 16 stores the weight values detected at the respective strain gauges 11 in a memory 17 as unoccupied loads.

In the figure, since four strain gauges 11 are provided, four unoccupied load memories corresponding thereto are provided in the memory 17, in which the unoccupied loads are stored respectively. Thereafter, the value obtained by deducting the unoccupied load from the weight calculated from the output of each differential amplifier 13 is taken as a load detected by each strain gauge 11. The value obtained by summing these values is used by the MPU 16 for other controls as a load exerted onto the seat (for example, the weight of the occupant), and are supplied to external equipment as required.

As described above, when the seat weight is detected by four load sensors, in normal conditions each load sensor should be able to detect a maximum load of about 60 kgf even with the tare weight of the seat taken into account. On the other hand, in case of automobile collision accident or the like, an excessive load such as 100 kgf or more may be exerted onto these load sensors, which may result in breakage of the load sensors. Therefore, a mechanism for protecting the load sensor from excessive loads is practically provided though it is not shown in the figure. For example, there is provided a mechanism that mechanically prevents excessive deformation of the displacement member 2 even when a total load that may exceed 60 kgf for each sensor acts on the displacement member as shown in FIG. 8.

The seat weight measuring apparatus having such a construction has a recognized disadvantage because while there exists no problem when the loads acting on the respective load sensors are uniform, a problem is encountered that when there are extreme differences among the loads acting on the respective load sensors. In these circumstances, an accurate load cannot be measured. For example, assuming that the sum of the weight of the seat and of a person sitting on the seat is 100 kg, when the load is exerted uniformly on each load sensor, the load exerted on each load sensor will be 25 kgf. However, when the person sits on the seat with the seatback reclined, there may be the case where a load of −20 kgf is exerted onto each of the front two load sensors (that is, a load in the upper direction is exerted), and a load as much as 70 kgf is exerted onto each of the rear two load sensors.

In this case, since the load is mechanically blocked when a load of more than 60 kgf is exerted on one sensor as described above, the value detected by the rear load sensor will be 60 kgf at the maximum. As a consequence, the sum of the values from four load sensors will be (−20 kgf)×2+(60 kgf)×2=80 kgf, and thus the wrong measured value is supplied.

Even when the seat is vacant, if the seat is deformed, the tare weight (a weight exerted when no person is seated) sensed by each load sensor may vary as much as ±40 kgf. In the sensor having a tare output of ±40 kgf, the output may be saturated only with exertion of a load as little as 20 kgf (for example, a load exerted by an occupant), and thus an accurate output cannot be obtained yet. In certain circumstances, this problem may lead to an incorrect determination of whether an occupant is a child or an adult.

Even when an occupant is sitting in a normal posture, and the load exerted on each of the four legs is uniform, if the vehicle travels on a road having rough surface, a load in excess of the weight of the occupant is generated and thus the mechanical blockage provided to protect the load sensor from an excessive load may intermittently engage. In such a case, using a filtering process or averaging process for removing the influence of traveling condition of the vehicle from the measured load data may result in obtaining a value smaller than the true average weight which may lead to a wrong determination.

In addition, there may be the case where the output of the load sensor is temporarily saturated or an extremely large output is supplied due to the electrical noise or the electrically loose connection even when a load is not actually exerted thereon. In such a case, a wrong value may be measured as in the case where a mechanical blockage is effected, which may leads to a wrong determination, although it is different in that the weight measured is larger than the actual value.

SUMMARY OF THE INVENTION

With such circumstances in mind, an object of the present invention is to provide a seat weight measuring apparatus that can provide an accurate load output even when one or more sensors are exposed to a load in excess of its measurable load.

According to a first embodiment of the present invention an apparatus is provided for measuring the weight of the seat in the passenger car. The apparatus includes a plurality of load sensors for supporting the seat and measuring the load thereof, and an adder for summing the outputs of the load sensors to obtain the weight of the seat, wherein the capability of obtaining the seat weight based on the value other than the output of the adder at that moment when at least one of the outputs of the load sensors exceeds a predetermined value is provided.

According to this first embodiment, when at least one of the outputs of the load sensors exceeds the predetermined value, the seat weight at that moment is obtained based on the value other than the output of the adder. The predetermined value is set to the value which is the same level as, or a bit lower than the value at which the output of each sensor is saturated. Therefore, when the output is saturated or is almost saturated, the output value is determined based on another value, but not on the output value, so that a wrong measured value may be prevented from being supplied.

According to a second embodiment of the present, the apparatus of the first embodiment is arranged so that the capability of obtaining the seat weight based on the value other than the output of the adder employs the seat weight which is obtained immediately before at least one of outputs of the load sensors exceeds the predetermined value.

According to this second embodiment, since the seat weight employed is the seat weight obtained immediately before at least one of the outputs of the load sensors exceeds the predetermined value, the accurate seat load before the output is saturated can be continuously supplied as an output even when the output of the load sensor is saturated. Therefore, even when the output of the load sensor is saturated, there is no possibility to supply an inaccurate output.

A third embodiment of the present invention includes the apparatus of the first embodiment configured so that the capability of obtaining the seat weight based on the value other than the output of the adder employs the larger seat weight between the seat weight obtained immediately before at least one of the outputs of the load sensors exceeds the predetermined value and the seat weight at that moment.

While the apparatus of the third embodiment has the same effect as the apparatus of the first embodiment when the predetermined value is set to the same as the value at which the output of each sensor is saturated, it can provide an accurate output continuously in comparison with the first embodiment when the predetermined value is set to the value which is a bit lower than the value at which the output of each sensor is saturated.

A fourth embodiment of the present invention includes the apparatus of the first embodiment configured so that the capability of obtaining the seat weight based on the value other than the output of the adder employs an average of the seat weights obtained during a predetermined period immediately before at least one of the outputs of the load sensors exceeds the predetermined value.

According to the fourth embodiment, since the seat weight employs the average of the seat weights obtained during the predetermined period, but not the seat weight obtained immediately before at least one of the outputs of the load sensors exceeds the predetermined value, an accurate seat load can be detected even when the load is varied to a large extent, for example, during travel on the rough road.

A fifth embodiment of the present invention includes the apparatus of the first embodiment configured so that the capability of obtaining the seat weight based on the value other than the output of the adder obtains the seat weight by reducing the absolute value of the output of the load sensor which detected a negative load and then adding the outputs of the respective load sensors.

In the apparatus of the fifth embodiment, the absolute value of the output of the load sensor which detected a negative load is reduced, for example, by replacing the negative load detected by the load sensor with 0 kgf, or with a value multiplied by a predetermined factor smaller than one. Therefore, although the seat weight cannot be measured accurately, the extent of error can be reduced.

The apparatus according to the fifth embodiment is effective when a heavy occupant is seated before the ignition key of the vehicle is turned on (that is, before the measurement of the seat weight is started), and the seat is in the reclined state. In other words, in such a case, the apparatuses discussed above according to the second through fourth embodiments are not effective. With the apparatus according to the fifth embodiment, however, wrong control resulting from mistakenly measuring the weight of the heavy occupant as if he or she has the lighter weight may be prevented.

According to a sixth embodiment of the present invention, an apparatus for measuring the weight of the seat in the passenger car is provided. The apparatus includes a plurality of load sensors for supporting the seat and measuring the load thereof, and an adder for summing the outputs of the load sensors to obtain the weight of the seat, wherein the capability of regarding the value other than the output of the sensor in question as the value of the load sensor to be supplied to the adder when at least one of the outputs of the load sensors exceeds the predetermined value is provided.

A seventh embodiment of the present invention includes the apparatus of the sixth embodiment configured so that the capability of regarding the value other than the output of the sensor in question as the value of the load sensor to be supplied to the adder is the capability of replacing the value of the load sensor in question with the value obtained immediately before the output of the sensor in question exceeds the predetermined value.

An eighth embodiment of the present invention includes the apparatus of the sixth embodiment configured so that the capability of regarding the value other than the output of the sensor in question as the value of the load sensor to be supplied to the adder is a capability of regarding the larger value between the value obtained immediately before the output of the sensor in question exceeds the prescribed value and the output of the sensor at that moment as the value of the load sensor in question.

A ninth embodiment of the present invention includes the apparatus of the sixth embodiment configured so that the capability of regarding the value other than the output of the sensor in question as the value of the load sensor to be supplied to the adder is a capability of regarding the average of the outputs of the sensor in question for the predetermined period immediately before the output of the sensor in question exceeds the predetermined value as the value of the load sensor in question.

The apparatus of the sixth through the ninth embodiments are the same in basic technical idea and action as those described in the first through the fourth embodiments. However, while the entire seat weight is replaced with the value different from the value obtained from the output of the sensors when the output of one of the sensors at that moment exceeds the predetermined value in the apparatus of the first to the fourth embodiments respectively, only the value of the sensor in excess of the predetermined value is changed to another value and the output of other sensors are used without change in the apparatuses of the sixth to the ninth embodiments. Therefore, more precise measurement is possible in the latter embodiments in comparison with those from the first to the fourth embodiments.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DESCRIPTION

Referring now to the drawings, the embodiment of the present invention will be described. The figures from FIG. 1 to FIG. 4 are flow charts showing examples of capabilities of the seat weight measuring apparatus according to the embodiments of the present invention. The routine shown in each flow chart is activated at predetermined intervals.

Figure 1:
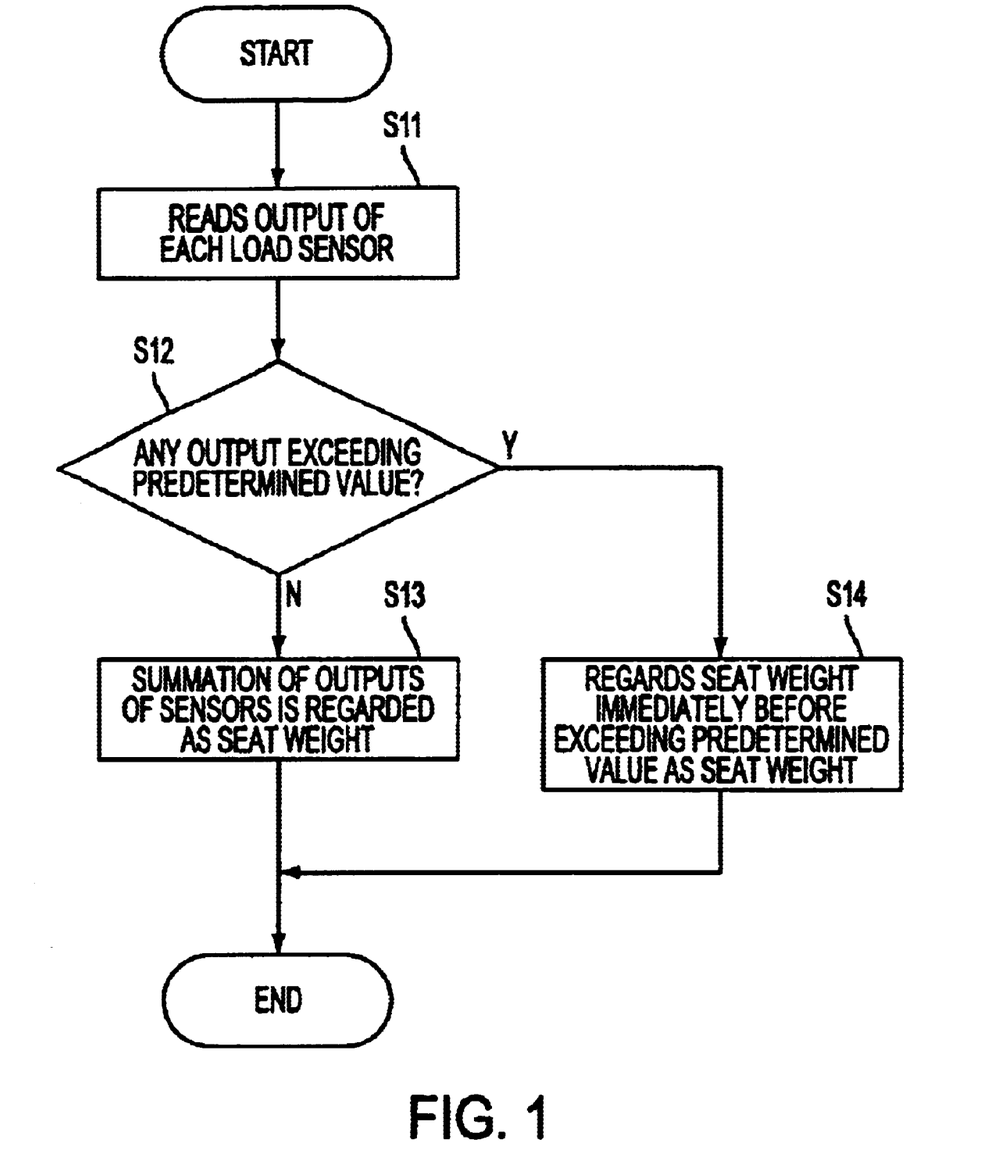
FIG. 1 is a flow chart showing the first example of the capability of the seat weight measuring apparatus according to an embodiment of the present invention.

In the process shown in FIG. 1, the output of each load sensor is read at Step 11. Subsequently, at Step S12, whether or not there is any sensor whereof the output is in excess of the predetermined value is determined. If no output of these sensors is in excess of the predetermined value, it is regarded to be normal, and the seat weight is obtained by summation of the outputs of the respective sensors at Step S13.

When the output of any sensor exceeds the predetermined value, it is determined that an offset load is exerted thereon and thus the output of the sensor in question cannot be trusted. Therefore, the seat weight obtained immediately before the output of any of the sensors exceeds the predetermined value is regarded as the seat weight.

Figure 2:
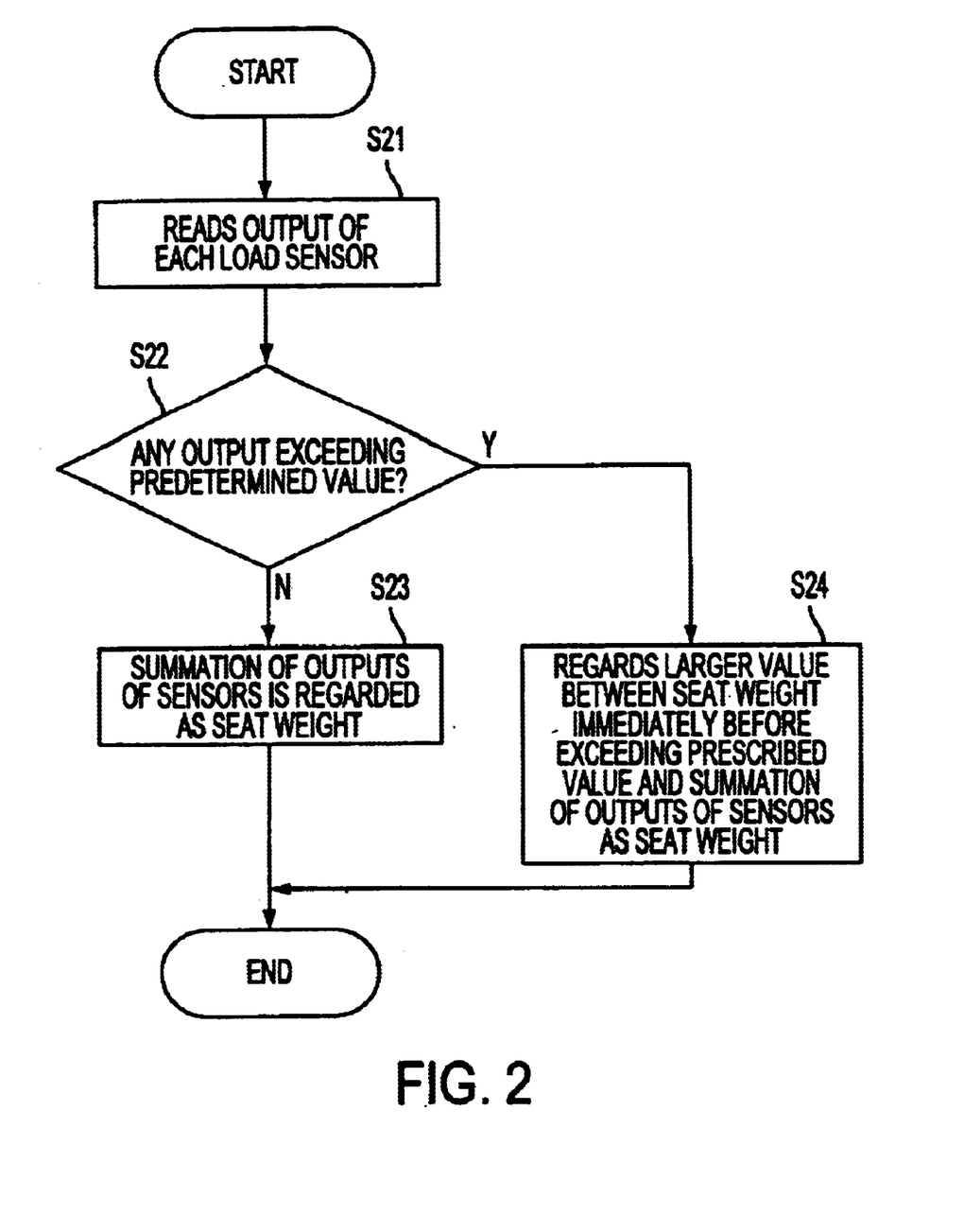
FIG. 2 is a flow chart showing the second example of the capability of the seat weight measuring apparatus according to an embodiment of the present invention.

In the process shown in FIG. 2, the output of each load sensor is read at Step S21. Subsequently at Step S22, whether or not there is any sensor whereof the output is in excess of the predetermined value is determined. If no output of these sensors is in excess of the predetermined value, it is regarded as normal, and the seat weight is obtained by summation of the outputs of the sensors at Step S23.

When the output of any sensor exceeds the predetermined value, it is determined that an offset load is exerted thereon. Then at Step S24, the larger seat weight between the seat weight obtained immediately before the output of any sensor exceeds the predetermined value and the sum of the outputs of the respective sensors at the present moment is regarded as the seat weight.

Figure 3:
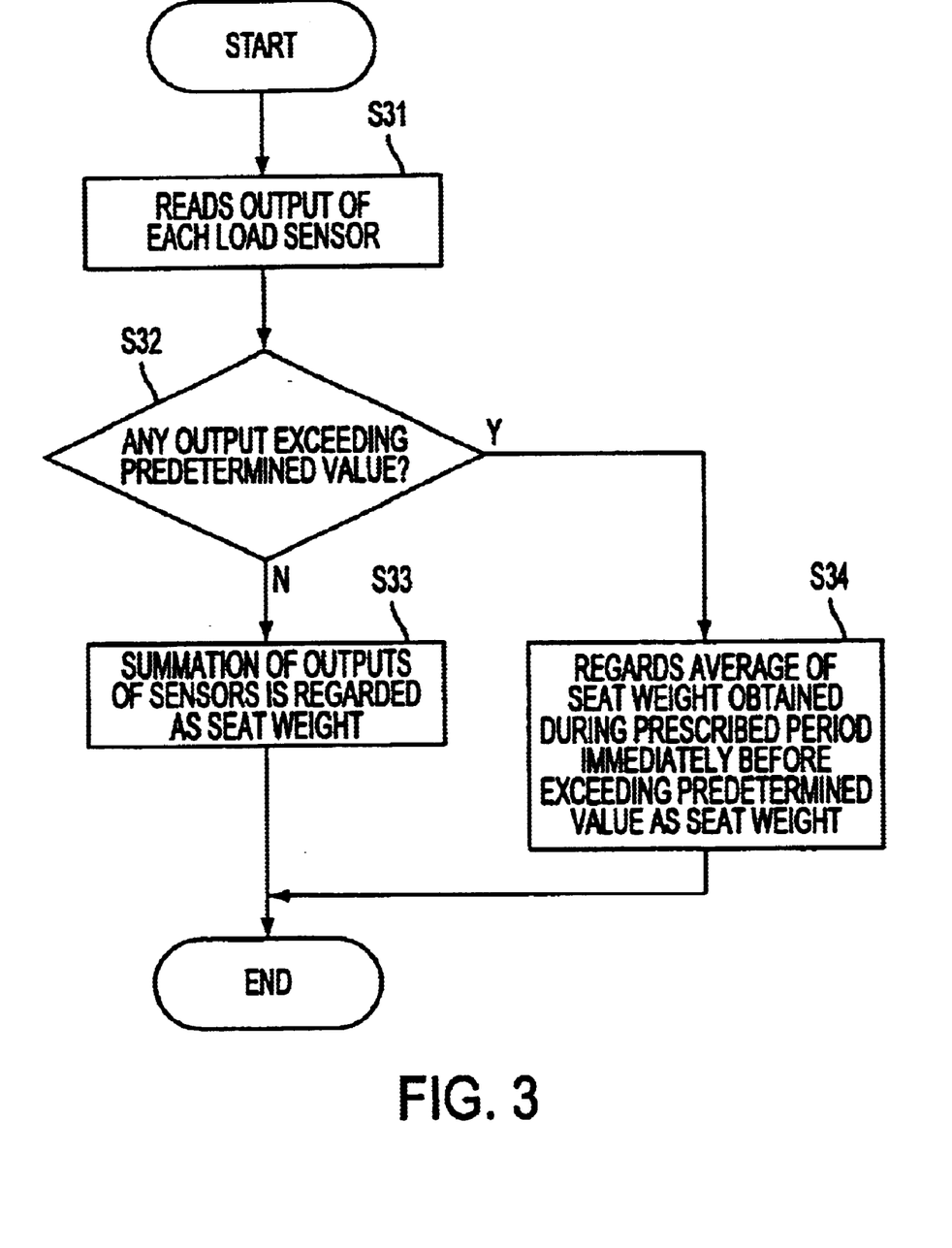
FIG. 3 is a flow chart showing the third example of the capability of the seat weight measuring apparatus according to an embodiment of the present invention.

In the process shown in FIG. 3, the output of each load sensor is read at Step S31. Subsequently, at Step S32, whether or not there is any sensor whereof the output exceeds the predetermined value is determined. If no output of these sensors is in excess of the predetermined value, it is regarded as normal, and the seat weight is obtained by summation of the outputs of the respective sensors at Step S33.

When the output of any sensor exceeds the predetermined value, it is determined that an offset load is exerted thereon and thus the output of the sensor in question cannot be trusted. Therefore, the average of the seat weight during the predetermined period obtained immediately before the output of any of the sensors exceeds the predetermined value is regarded as the seat weight, at Step S34.

Figure 4:
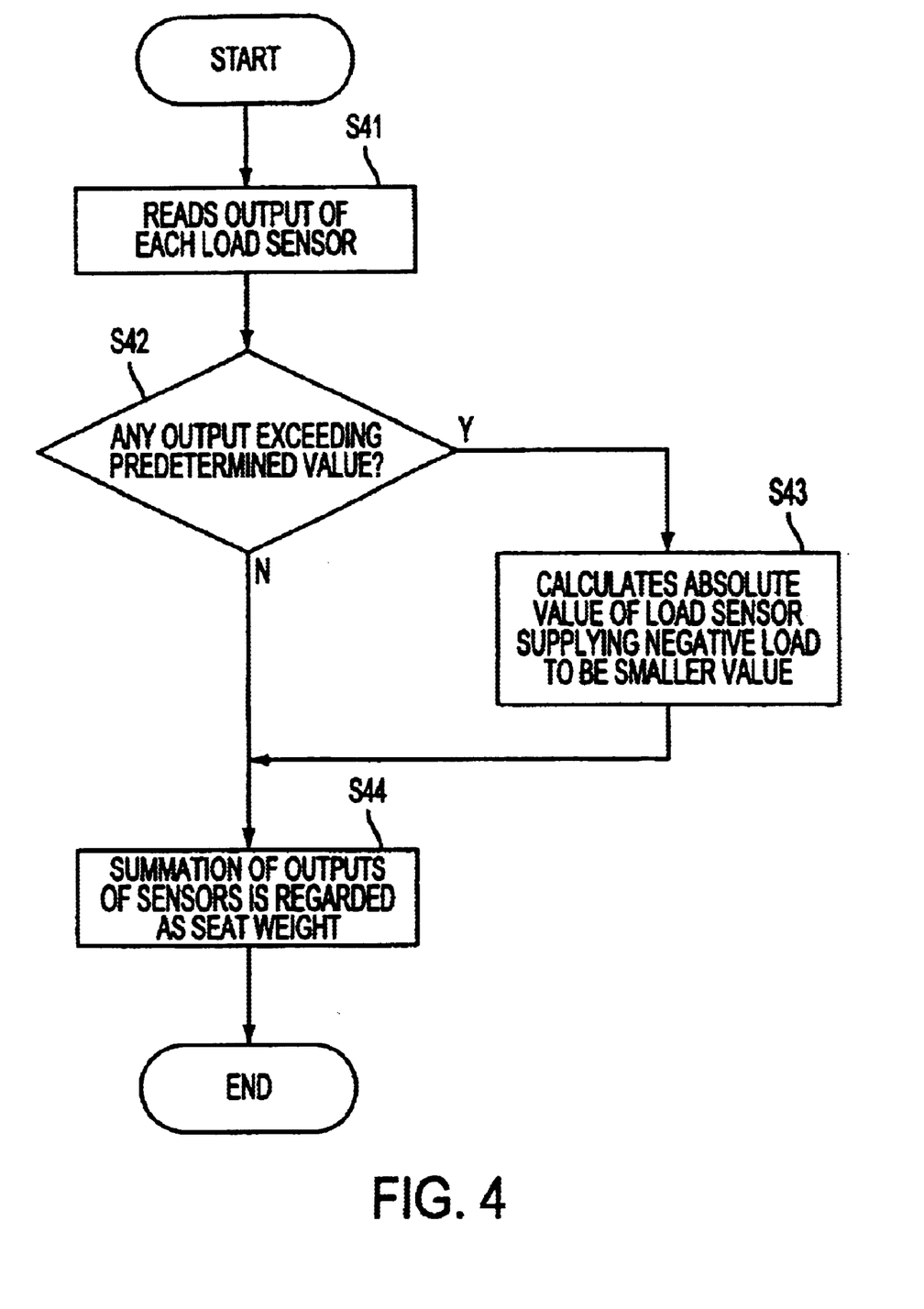
FIG. 4 is a flow chart showing the fourth example of the capability of the seat weight measuring apparatus according to an embodiment of the present invention.

In the process shown in FIG. 4, the output of each load sensor is read at Step S41. Subsequently, at Step S42, whether or not there is any sensor whereof the output exceeds the predetermined value is determined. If no output of these sensors is in excess of the predetermined value, it is regarded as normal, and the seat weight is obtained by summation of the outputs of the respective sensors at Step S44.

When the output of any sensor exceeds the predetermined value, it is determined that an offset load is exerted thereon and thus the output of the sensor in question cannot be trusted. Therefore, the absolute value of the sensor whereof the load is negative is calculated to be a smaller value at Step S43, and the seat weight is obtained from summation of the outputs of the respective sensors at Step S44.

Figure 5:
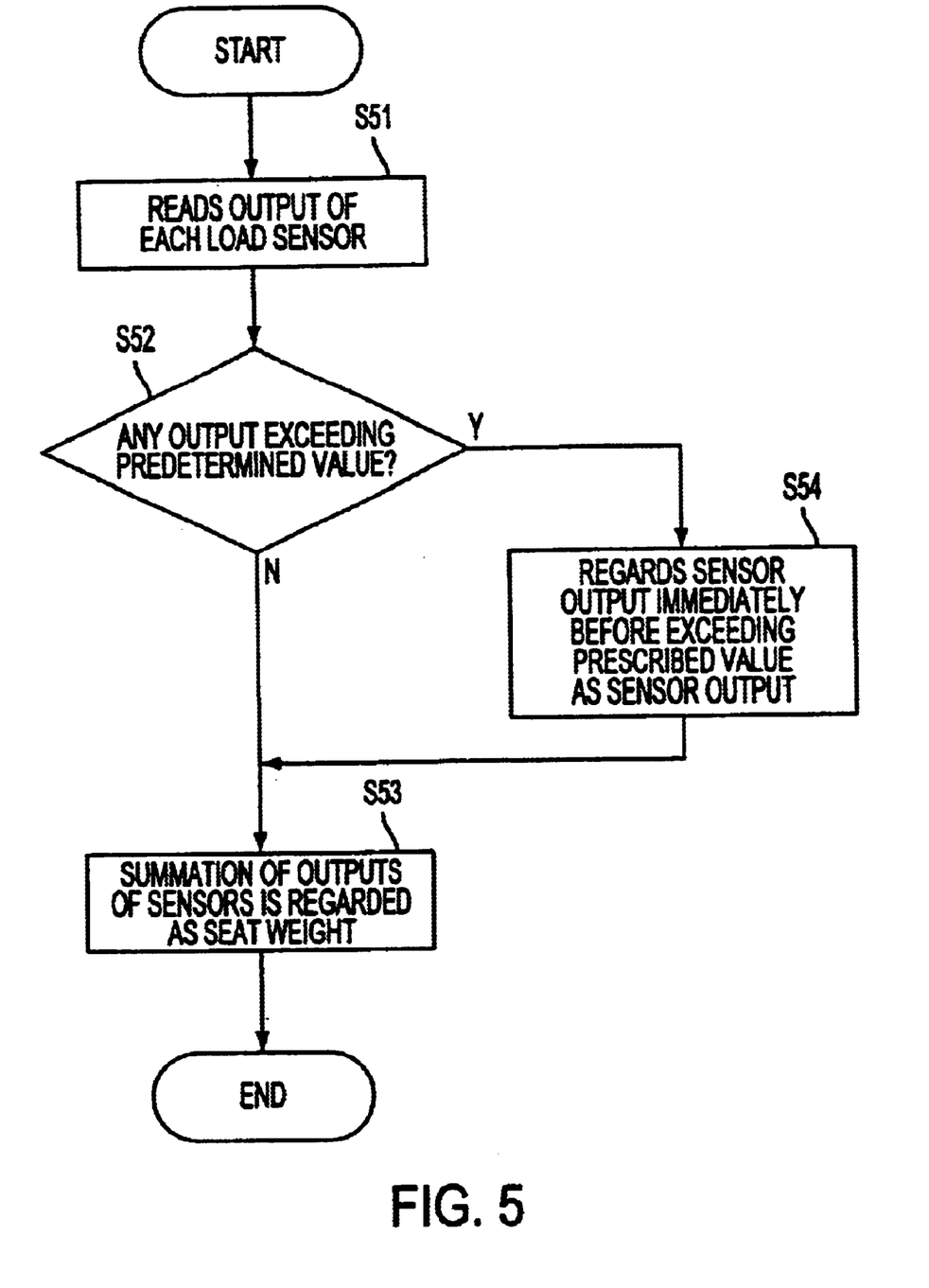
FIG. 5 is a flow chart showing the fifth example of the capability of the seat weight measuring apparatus according to an embodiment of the present invention.

In the process in FIG. 5, the output of each load sensor is read at Step S51. Subsequently, Step S52, whether or not there is any sensor whereof the output exceeds the predetermined value is determined. If no output of these sensors is in excess of the predetermined value, it is regarded as normal, and the seat weight is obtained by summation of the outputs of the respective sensors at Step S53.

When the output of any sensor exceeds the predetermined value, it is determined that an offset load is exerted thereon and thus the output of the sensor in question cannot be trusted. Therefore, the output of the sensor is replaced with the output of the sensor obtained immediately before it exceeds the predetermined value at step S54, and subsequently, the seat weight is obtained by summation of the outputs of the respective sensors at Step S53.

Figure 6:
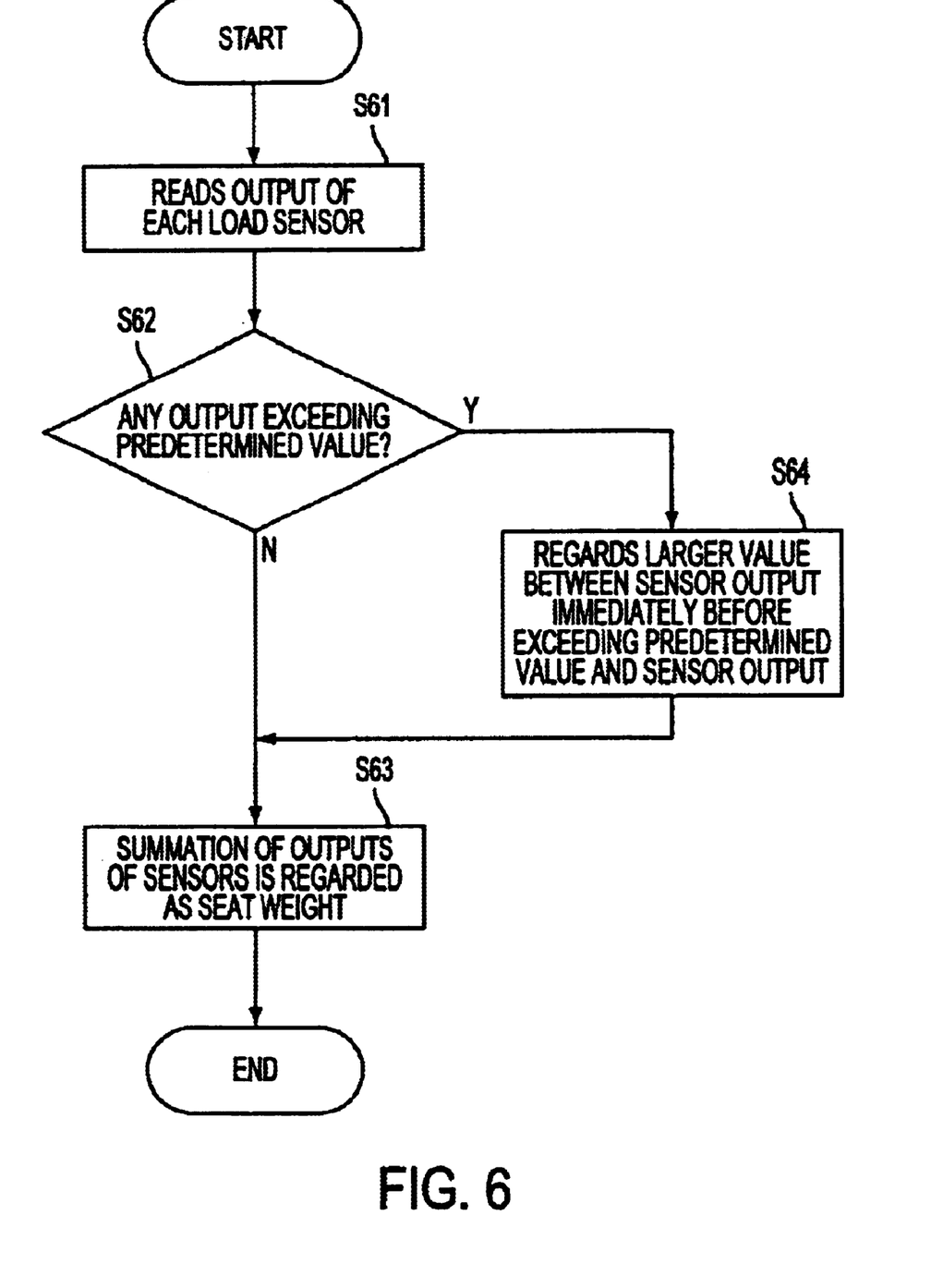
FIG. 6 is a flow chart showing the sixth example of the capability of the seat weight measuring apparatus according to an embodiment of the present invention.

In the process in FIG. 6, the output of each load sensor is read at Step S61. Subsequently, at Step S62, whether or not there is any sensor whereof the output exceeds the predetermined value is determined. If no output of these sensors is in excess of the predetermined value, it is regarded as normal, and the seat weight is obtained by summation of the outputs of the sensors at Step S63.

When the output of any sensor exceeds the predetermined value, it is determined that an offset load is exerted thereon and thus the output of the sensor in question cannot be trusted. Therefore, at Step S64, the output of the sensor obtained immediately before it exceeds the predetermined value is compared with the present sensor output, with the larger of the two values replacing the output of the sensor. Subsequently, at Step S63, the seat weight is obtained by summation of the outputs of the respective sensors.

Figure 7:
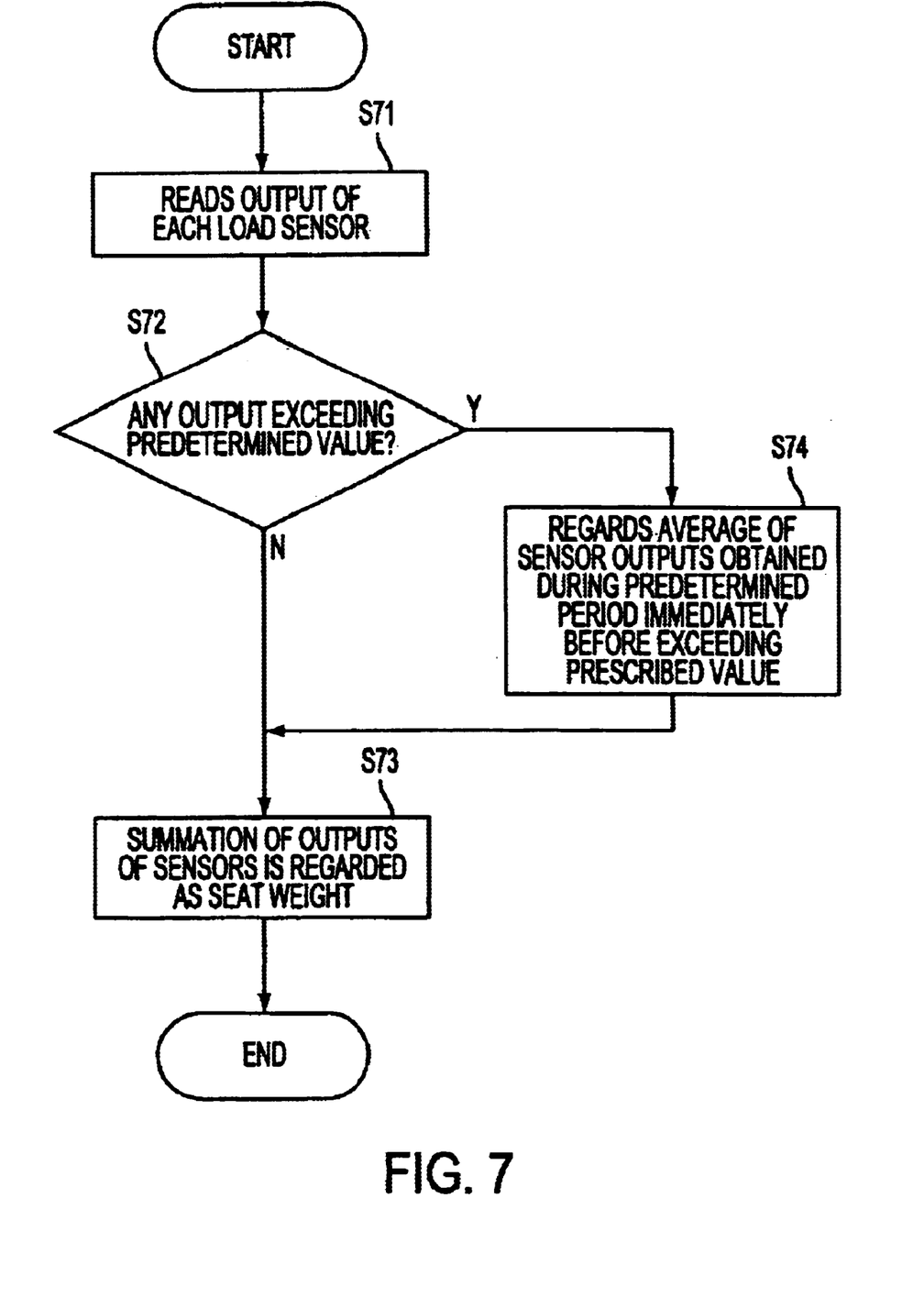
FIG. 7 is a flow chart showing the seventh example of the capability of the seat weight measuring apparatus according to an embodiment of the present invention.

In the process in FIG. 7, the output of each load sensor is read at Step S71. Subsequently, at Step S72, whether or not there is any sensor whereof the output exceeds the predetermined value is determined. If no output of these sensors is in excess of the predetermined value, it is regarded as normal, and the seat weight is obtained by summation of the outputs of the sensors at Step S73.

When the output of any sensor exceeds the predetermined value, it is determined that an offset load is exerted thereon and thus the output of the sensor in question cannot be trusted. Therefore, at the Step S74, the output of the sensor is replaced with the average of the output of the sensors obtained during the predetermined period immediately before it exceeds the predetermined value. Subsequently, the seat weight is obtained by summation of the outputs of the respective sensors at Step S63.

As described above, according to the present invention, even when any of the outputs of the plurality of load sensors is saturated due to the offset load, erroneous detection of the seat load with substantial margin of error is prevented, thereby control is prevented from being disordered.

The priority application, Japanese Patent Application No. 2001-064439 filed on Mar. 8, 2001, is hereby incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A seat weight measuring apparatus for passenger cars comprising:

a plurality of load sensors for supporting the seat and measuring the load of the seat, each sensor being adapted to produce an output; and an adder for summing the outputs of said load sensors to obtain the weight of the seat;

a mechanism for obtaining the seat weight based on a value other than the output of the adder when at least one of the outputs of the load sensors exceeds a predetermined value.

2. The seat weight measuring apparatus of claim 1, wherein the mechanism for obtaining the seat weight based on the value other than the output of the adder employs the seat weight obtained immediately before at least one of outputs of the load sensors exceeds the predetermined value.

3. The seat weight measuring apparatus of claim 1, wherein the mechanism for obtaining the seat weight based on the value other than the output of the adder employs the larger seat weight between the seat weight obtained immediately before at least one of the outputs of the load sensors exceeds the predetermined value and a present value of the seat weight.

4. The seat weight measuring apparatus of claim 1, wherein the mechanism for obtaining the seat weight based on the value other than the output of the adder employs an average of the seat weights obtained during a predetermined period immediately before at least one of the outputs of the load sensors exceeds the predetermined value.

5. The seat weight measuring apparatus of claim 1, wherein the mechanism for obtaining the seat weight based on the value other than the output of the adder obtains the seat weight by reducing the absolute value of the output of the load sensor which detected a negative load and then adding the outputs of the respective load sensors.

6. A seat weight measuring apparatus for vehicles, comprising:

a plurality of load sensors for supporting the seat and measuring the load of the seat, each sensor being adapted to providing an output; and an adder for summing the outputs of the load sensors to obtain the weight of the seat;

a mechanism for regarding a value other than the output of the sensor in question as the value of the load sensor to be supplied to the adder when at least one of the outputs of the load sensors exceeds the predetermined value is provided.

7. The seat weight measuring apparatus of claim 6, wherein the mechanism for regarding the value other than the output of the sensor in question as the value of the load sensor to be supplied to the adder is configured to replace the value of the load sensor in question with the value obtained immediately before the output of the sensor in question exceeds the predetermined value.

8. The seat weight measuring apparatus of claim 6, wherein the mechanism for regarding the value other than the output of the sensor in question as the value of the load sensor to be supplied to the adder is configured to regard the larger of the value of the load sensor obtained immediately before the output of the sensor in question exceeds the prescribed value and the value of the output of the sensor at that moment as the value of the load sensor in question.

9. The seat weight measuring apparatus of claim 6, wherein the mechanism for regarding the value other than the output of the sensor in question as the value of the load sensor to be supplied to the adder is configured to regard the average of the outputs of the sensor in question during a predetermined period immediately before the output of the sensor in question exceeds the predetermined value as the value of the load sensor in question.

10. A method for determining seat weight comprising the steps of:
   providing a plurality of load sensors for sensing the load of the seat, each load sensor producing an output;
   summing the outputs of the load sensors to obtain the weight of the seat;
   determining the seat weight based on a value other than the output of the adder when at least one of the outputs of the load sensors exceeds a predetermined value.

11. The method of claim 10, wherein the step of determining the seat weight based on the value other than the output of the adder includes using the seat weight obtained immediately before at least one of outputs of the load sensors exceeds the predetermined value.

12. The method of claim 10, wherein the step of determining the seat weight based on the value other than the output of the adder includes using the larger seat weight between the seat weight obtained immediately before at least one of the outputs of the load sensors exceeds the predetermined value and a present value of the seat weight.

13. The method of claim 10, wherein the step of determining the seat weight based on the value other than the output of the adder includes using an average of the seat weights obtained during a predetermined period immediately before at least one of the outputs of the load sensors exceeds the predetermined value.

14. The method of claim 10, wherein the step of determining the seat weight based on the value other than the output of the adder includes reducing the absolute value of the output of the load sensor which detected a negative load and then adding the outputs of the respective load sensors.

15. A method for determining seat weight comprising the steps of:
   providing a plurality of load sensors for sensing the load of the seat, each load sensor producing an output;
   summing the outputs of the load sensors to obtain the weight of the seat;
   regarding a value other than the output of one of the load sensors as the value of the load sensor to be supplied to the adder when at least one of the outputs of the load sensors exceeds the predetermined value is provided.

16. The method of claim 15, further comprising the step of replacing the value of one of the load sensors the value obtained immediately before the output of the sensor in question exceeds the predetermined value.

17. The method of claim 15, further comprising the step of regarding the larger of the value of the load sensor obtained immediately before the output of the sensor in question exceeds the prescribed value and the value of the output of the sensor at that moment as the value of the load sensor.

18. The method of claim 15, further comprising the step of regarding the average of the outputs of a first one of the load sensors during a predetermined period immediately before the output of the first sensor exceeds the predetermined value as the value of the first one of the load sensors.

* * * * *